United States Patent [19]
Davis et al.

[11] Patent Number: 5,893,395
[45] Date of Patent: Apr. 13, 1999

[54] FORMED RAGGLESTICK

[76] Inventors: A. Eugene Davis, 1318 Hardwick Rd., Pell City, Ala. 35125; D. Lawrence Moody, Jr., 213 Hunting Ridge Dr., Cropwell, Ala. 35054

[21] Appl. No.: 08/702,431

[22] Filed: Jan. 11, 1996

Related U.S. Application Data

[63] Continuation-in-part of application No. 08/430,397, Apr. 28, 1995, abandoned.

[51] Int. Cl.⁶ .................................................. F16L 9/18
[52] U.S. Cl. .................... 138/112; 138/177; 138/178; 138/DIG. 11; 206/443; 206/391
[58] Field of Search .......................... 138/106, 112, 138/117, 178, DIG. 11, 113; 206/820, 821, 822, 391, 443, 446; 248/68.1

[56] References Cited

U.S. PATENT DOCUMENTS

| | | | |
|---|---|---|---|
| 2,016,425 | 10/1935 | Goessling | 138/178 |
| 2,462,399 | 2/1949 | Hinchman | 138/106 |
| 2,663,321 | 12/1953 | Jantsch | 138/DIG. 11 |
| 2,686,643 | 8/1954 | Bloom et al. | 138/112 |
| 3,055,398 | 9/1962 | Tunnessen | 206/443 |
| 3,900,116 | 8/1975 | Gehri | 206/443 |
| 4,195,732 | 4/1980 | Bell | 206/391 |
| 4,199,070 | 4/1980 | Magnussen, Jr. | 248/68.1 |
| 4,435,463 | 3/1984 | Roellchen | 206/821 |
| 4,802,511 | 2/1989 | Hensley | 138/177 |
| 5,161,703 | 11/1992 | Patton | 206/446 |
| 5,542,339 | 8/1996 | Kaczmarczyk et al. | 138/106 |
| 5,605,419 | 2/1997 | Reinert, Sr. | 138/113 |

*Primary Examiner*—Denise L. Ferensic
*Assistant Examiner*—James F. Hook
*Attorney, Agent, or Firm*—L. F. Hilbers

[57] ABSTRACT

The malleable ragglestick 100 as shown in FIG. 1 comprises a plastic tube 110 of FIG. 2 having a circular axial cross-section as shown in FIG. 3 and having two (2) opposing sets of a multiplicity of cylindrically shaped depressions 130 as shown in FIG. 4, generally spaced apart.

10 Claims, 10 Drawing Sheets

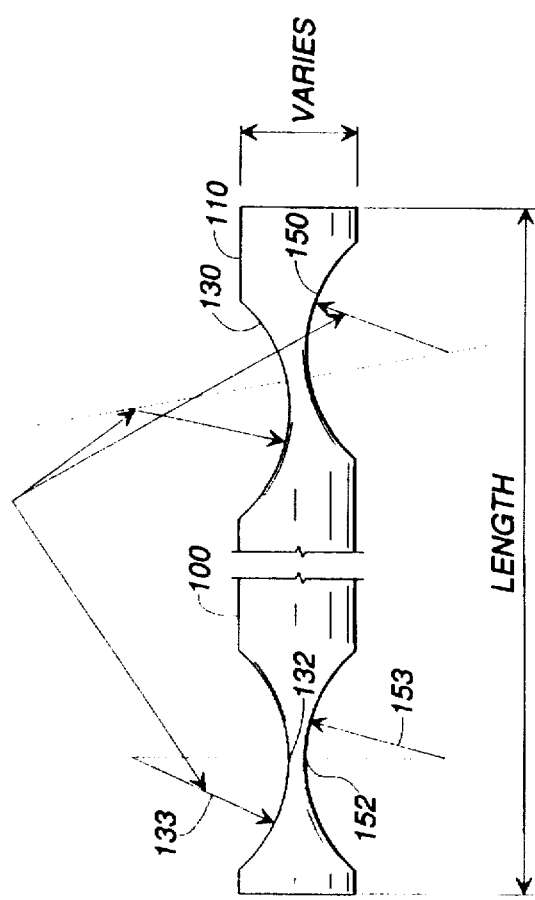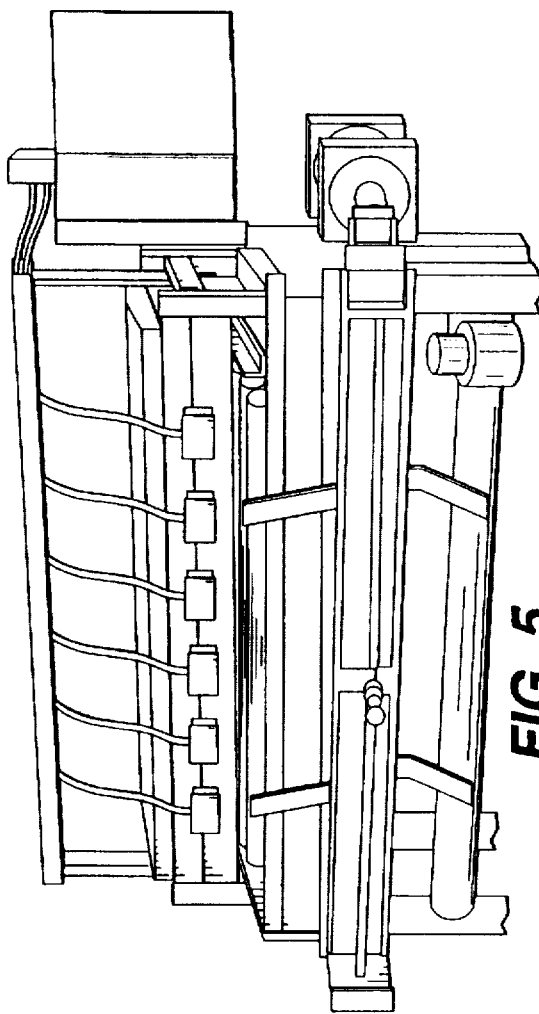

FORMED RAGGLESTICK

CROSS-REFERENCE TO RELATED APPLICATIONS

This is a Continuation-in-Part of U.S. Utility patent application filed on Apr. 28, 1995 (04-28-1995) under Ser. No. 08/430,397 by D. L. MOODY, JR., et al entitled PLASTIC RAGGLESTICK, Attorney Docket Number P-360 now abandoned.

BACKGROUND OF THE INVENTION

In those known cases in the prior art, a plurality of elongated pipes have been accumulated in a bundle and then tightly secured together with a steel wire or band or the like. This binding method has been widely adopted in the fields of transportation due to its relatively simple process. On the other hand, there are some disadvantages in that the elongated pipes are subjected to possible damages destroying protective coatings by direct contacting with the steel wire. Moreover, since the bundle formed of a plurality of elongated pipes is encircled and tightened by the steel wire which contacts only with some localized or restricted surface portions of each of the outermost disposed elongated pipes, those pipes within the bundle may shift and the bundle is liable to crush or deform during transportation or storage in a stacked condition. Thus the bundle is unstable and therefore unsafe and difficult to handle. Furthermore, in this conventional method, no countermeasures are provided for protecting each of the elongated pipes against bends or dents.

If cans are the articles being packaged, the beads of the cans have a tendency to cause the cans to shift within the package and make an irregular shaped and loose package. Numerous attempts have been made to apply means for maintaining proper alignment through locking devices or separators, and and the like. Such means have proved either very difficult to apply or costly in application. To overcome shifting and deformation of the package, a resilient preformed spacer can be placed between the units in the package.

The means comprises an elongated bar having a plurality of spaced indentations along at least one of the elongated surfaces. The indentations are suitable for receiving the rolls of material. The thickness of the bar adjacent the bottom of the indentations provides sufficient space to protect the rolls. The width of the bar, with respect to its height, provides a self-stabilizing property which prevent tipping. The bar is formed of a material of sufficient flexibility to permit limited relative movement among the rolls of the stack while at the same time being of sufficient strength to prevent crushing of the stack. Expanded polystyrene foam is suitable for use in the supporting and spacing members of the present invention.

The elongated bars, rods, or generally tubular members are placed between the rolls and materials handling apparatus such as a pallet, between the various layers of the stack, and on top of the stack.

According to this prior art the binding device for a plurality of elongated pipes comprises a pair of pipe reception blocks, first and second sleepers interposing the blocks therebetween, and a bundling strap encircling a pair of the pipe reception blocks, and the first and second sleepers. A plurality of elongated pipes are disposed side by side or in transverse arrangement with respect to the longitudinal axes of the pipes each within a space defined by the concavities formed on one surface of the blocks. This assembly is completed and integrated by a tightly encircled bundling strap means along the traverse surface of the assembly. This assembly may be stacked in overlying arrangement with one or more of other similar assemblies.

The pipe reception block may be made of two regions of different material, one being the region where the concavities are formed and the other being the region where the surface contacting with the sleeper is formed. The former region is preferably made of a veneer plywood. The different materials are fixed together with an appropriate adhesive agent. The pipe reception block thus constructed has sufficient mechanical strength to bear against deformation so that it protects the elongated pipes form deformation and also enables to decrease the height of the sleepers which might have otherwise been of a considerable volume so as to withstand the external forces imparted during handling or transportation.

Another prior art device discloses a roll spacing and supporting structure including an elongated bar of expanded foam material, such as polystyrene, for use in palletizing rolls of material and protecting such rolls against damage in handling and shipment. Such elongated bar provides a plurality of spaced semi-cylindrical indentations along at least one of the surfaces for receiving rolls of material. Further, such an elongated bar of expanded foam material includes a plurality of recesses located within or adjacent to the side portions of the semi-cylindrical indentation to provide flexural cushioning. These bars restrict movement among the rolls of the stack while, at the same time, are of sufficient strength to prevent crushing and collapse of the stack. Also disclosed is one embodiment which provides an integral lip along the outside edge of a semi-cylindrical indentation of a supporting bar to protect an otherwise exposed end of a material roll from damage.

In use, the elongated bars may be placed between the bottom layer of rolls and the supporting pallet, between each layer of rolls in the stack, and on top of the stack. In one form of stacking arrangement, each layer contains a number of rolls of material arranged in parallel and axial orientation. The supporting bars may be arranged parallel to one another and spaced apart with the end portions of each roll supported in a semicircular indentation provided by adjacent spaced bars.

The bars located in the interior of a stack as disclosed, receive and support the ends of axially adjacent rolls. In other words, a semi-cylindrical indentation provided by an interiorly located bar may be required to support the end portions of two rolls of material. Movement of the rolls within the stack has been minimized by securing a palletized stack with strapping and stretch wrap film.

The elimination of strapping from a pallet containing a multi-layer stack under certain loading configurations has been found to cause alignment problems within the stack because of vibrations of the type experienced during shipping and handling. Slight movements between the components of the stack may be caused by tilting, jarring, or similar forces encountered in shipping, which might result in either a roll or a supporting bar shifting within the stack. If such movement becomes large enough, the relative axial displacement of a roll may cause it to drop off a supporting bar. Alternatively, such movement may cause the rolls to be pushed together which might cause damage to the roll ends. The invention set forth herein provides a solution to these problems.

SUMMARY

In view of the foregoing, it is an object of the present Invention to provide a method and apparatus for economically effectively protecting pipes or other tubular-like or cylindrical-like or modular products from shifting damage which might be sustained particularly during shipment or other handling, which method or apparatus is easily applied for transporting the products and is easily removed for the purpose of withdrawing individual products within the group without destroying the stability of the remainder.

Still another advantage of the present Invention is the provision of a method and apparatus for binding a plurality of elongated pipes in which the above disadvantages are fully eliminated.

Another advantage of the present Invention is the provision of a method and apparatus the application of which can be quickly learned by unskilled laborers.

Another advantage of the present Invention is the provision of a method and apparatus that affords ready inspection to determine package integrity before transporting the package.

Another advantage of the present Invention is the provision of a method and apparatus that results in a low profile device resulting in a maximizing of the unit density over a vertical dimension or a horizontal dimension thus maximizing the number of units that can be transported by conventional means.

Another advantage of the present Invention is the provision of a method and apparatus that can be used to store, and withdraw from storage, pipes of tubes or rods or other cylindrical units without the requirement of external assistance or means such as racks or shelving.

Another advantage of the present Invention is the provision of a method and apparatus for storage and shipment of units that requires no external confinement or restraint during the assembly of the array.

An advantage of the present Invention is the provision of a method and apparatus, which may be fabricated from recyclable material, for protecting pipes or other tubular-like or cylindrical-like products from shifting damage.

An advantage of the present Invention is the provision of a method and apparatus for protecting pipes or other tubular-like or cylindrical-like products from shifting damage Which may be fabricated from hollow rods, or other generally tubular members, resulting in lower material costs.

An advantage of the present Invention is the provision of a method and apparatus for protecting pipes or other tubular-like or cylindrical-like products from shifting damage that has a much lower profile thus increasing the numbers of individual product items based on volume that may be shipped in one truck load.

An advantage of the present Invention is the provision of a method and apparatus for protecting pipes or other tubular-like or cylindrical-like products from shifting damage wherein the shaping step of the fabrication process may be accomplished primarily by using heat.

Another advantage to the present Invention is the provision of a method and apparatus for heat shaping indentions on heated generally tubular members as ragglesticks using molds to produce a multiplicity of removably self-locking seats or indentions such as depressions, saddles, accurate portions or other general recessions with surface shapes such as concavo-concave, dished, or generally semi-cylindrical surfaces defined by rotation of a line, paralleling and about an axis, or defined by movement of a line, paralleling and in nonrotating movement about an axis, or portions of said generally semi-cylindrical surfaces on the surface of the unformed (original shaped) generally tubular member, with said molds being shaped as portions of right circular cylinders, squares, rectangles, "V's", cylinders with polygon cross section, cylinders of elliptical cross section or other shapes producing a separating and self locking function of the pipes or units.

Another advantage of the present Invention is the provision of a method and apparatus for protecting and conveniently arranging pipes or other tubular-like or cylindrical-like products, during transportation or storage or loading or unloading the transporting or storing framework or structure, by providing combinations of ragglesticks possessing a number of receiving depressions or recessions of one radius or size on one side, a number of receiving depressions or recessions of another or the same radius on an opposite side, a number of receiving depressions or recessions of another or the same radius along a portion of the length of the ragglestick and/or a number of receiving depressions or recessions of another or the same radius along a second or subsequent portion of the length of the same ragglestick.

Another advantage of the present Invention is the provision of a method and apparatus for protecting and conveniently arranging pipes or other tubular like or cylindrical-like products during transportation or shipping herein the sequence of storage or arranging given sizes of pipes or objects for packaging and/or the sequence of removing said given sizes of pipes or objects are particularly chosen to accommodate delivery of selected identified pipes or objects without disturbing or handling the remaining pipes or objects, or are particularly chosen to accommodate withdrawing from storage of the selected identified pipes or objects without disturbing or handling the remaining pipes or objects.

An advantage of the present Invention is the provision of a method and apparatus for protecting pipes or other tubular-like or cylindrical-like products from shifting damage wherein the fabrication process results in no scrap material.

In accordance with features of this Invention, a malleable ragglestick comprises a malleable rod or tube, not necessarily circular in axial cross-section, formed to have the effect of a conventional ragglestick.

BRIEF DESCRIPTION OF THE DRAWINGS

The foregoing and other and further objects, features, and advantages of the Invention will be indicated in the appended claims or will be apparent upon an understanding of the following more particular description of preferred embodiments as illustrated in the accompanying drawings in which a reference character refers to the same part throughout the various views as set forth in the two (2) Indices immediately following the List of Figures immediately below. The drawings are not necessarily to scale, emphasis instead being placed upon illustrating the principles of the Invention. Moreover, various objects, features, and advantages of the Invention not referred to herein will occur to one skilled in the art upon employment of the Invention in practice.

FIG. 4 is a side view of the tube of FIG. 1 showing the depressions and the relationship of the depressions to each other when pipes of one diameter are packed under pipes of a smaller diameter.

FIG. 5 is a perspective front view of a first preferred embodiment of a device for the fabrication of the malleable ragglestick of FIG. 1 shown as it would appear just after loading the tube at the commencement of a fabrication process including the steps of loading the tube, pressing the tube, retreating from pressing the tube, and discharging the tube.

Figure 1:
FIG. 1 is a perspective end view of a first preferred embodiment of a malleable ragglestick comprising a plastic tube having a multiplicity of depressions.

An Index of Reference Characters as well as an Index of Part Names follow:

BRIEF DESCRIPTION OF THE DRAWINGS
INDEX

REFERENCE CHARACTERS

100 Formed ragglestick
110 Tube (Unformed)
130 Depression, top
132 Midpoint, first
133 Radius, first
150 Depression, bottom
152 Midpoint, second
153 Radius, second
200 Fabricating device
201 Rack entrance
202 Heating unit
203 Rack exit
204 Mechanism to control material advance
205 Forming molds press
206 Mechanism to operate forming molds
300 Electrical system
301 Power supply
302 Transformer
303 Heat relay
304 Heat timer
305 Forming timer

BRIEF DESCRIPTION OF THE DRAWINGS
INDEX

INDEX OF PART NAMES

150 Depression, bottom
130 Depression, top
300 Electrical system
200 Fabricating device
100 Formed ragglestick
205 Forming molds press
305 Forming timer
303 Heat relay
304 Heat timer
202 Heating unit
204 Mechanism to control material advance
206 Mechanism to operate forming molds
132 Midpoint, first
152 Midpoint, second
301 Power supply
201 Rack entrance
203 Rack exit
133 Radius, first
153 Radius, second
302 Transformer
110 Tube, Unformed

DETAILED DESCRIPTION OF THE INVENTION

Figure 2:
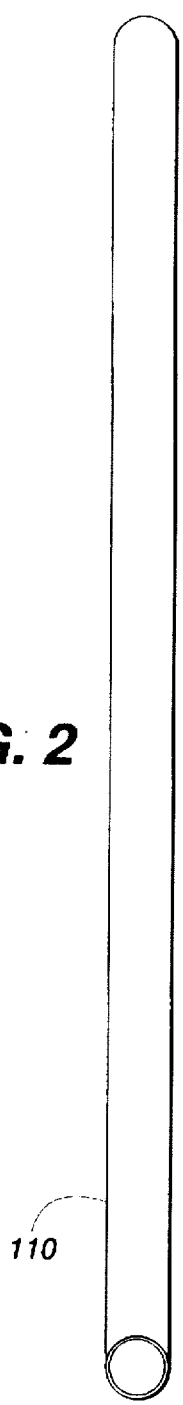
FIG. 2 is a perspective end view of the tube of FIG. 1.
Figure 13:
FIG. 13 is a perspective end view of a typical prior art ragglestick which can be replaced by the malleable ragglestick of FIG. 1.
Figure 3:
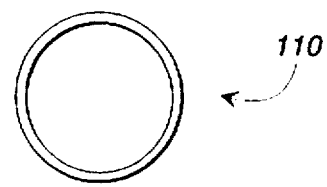
FIG. 3 is an end view of the tube of FIG. 2 having a circular cross-sectional configuration.

A first preferred embodiment 100 of the malleable ragglestick as shown in FIG. 1 is intended to support and confine an upper row of circular pipe product from the bottom and support and confine a lower row of product from the top and comprises a plastic tube 110 of FIG. 2 having a circular axial cross-section as shown in FIG. 3 and having two (2) sets of a multiplicity of depressions, namely a set of top depressions 130 and a set of bottom depressions 150 as shown in FIG. 4, generally spaced apart.

Figure 11:
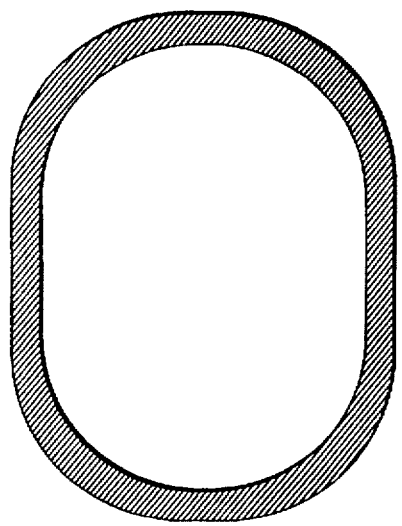
FIG. 11 is an end view of the tube of FIG. 2 having a rectangular or square cross-sectional configuration.
Figure 12:
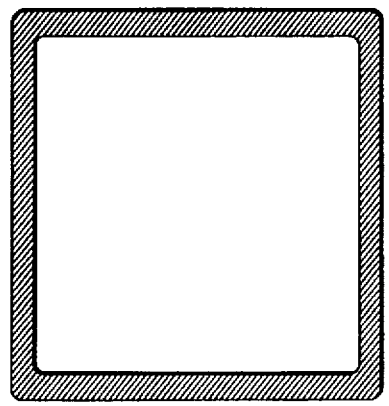
FIG. 12 is an end view of the tube of FIG. 2 having a elliptical or oblong cross-sectional configuration.

Other possible cross-sections are shown in FIG. 11 and FIG. 12.

Each top depression 130 has first midpoint 132 and each bottom depression 150 has second midpoint 152.

The set of top depressions 130 of said first preferred embodiment 100 are fabricated so that the entire surface of each top depression 130 will fit snugly against the outside wall of the upper product which is supported by top depressions 130 and thus each top depression 130 has a first radius 133 nearly equal to the outside radius of the upper product. Each first midpoint 132 is spaced apart from each adjacent first midpoint 132 by a distance equal to twice (2×) the first radius 133.

The set of bottom depressions 150 of said first preferred embodiment 100 are fabricated so that the entire surface of each bottom depression 150 will fit snugly against the outside wall of the lower product which supports each bottom depression 150 and thus each bottom depression 150 has a second radius 153 nearly equal to the outside radius of the lower product. Each second midpoint 152 is spaced apart from each adjacent second midpoint 152 by a distance equal to twice (2×) the second radius 153.

The first radius 133 may be equal to the second radius 153.

The diameter of the tube 110 is chosen so that the area of each top depression 130 and each bottom depression 150 is sufficiently large to provide the necessary support. The length of the tube 110 is equal to the width of the bed of the truck trailer or railroad car or other such determining dimension. The thickness of the wall of the tube 110 is large enough to maintain structural integrity and small enough to facilitate the fabrication process.

Figure 6:
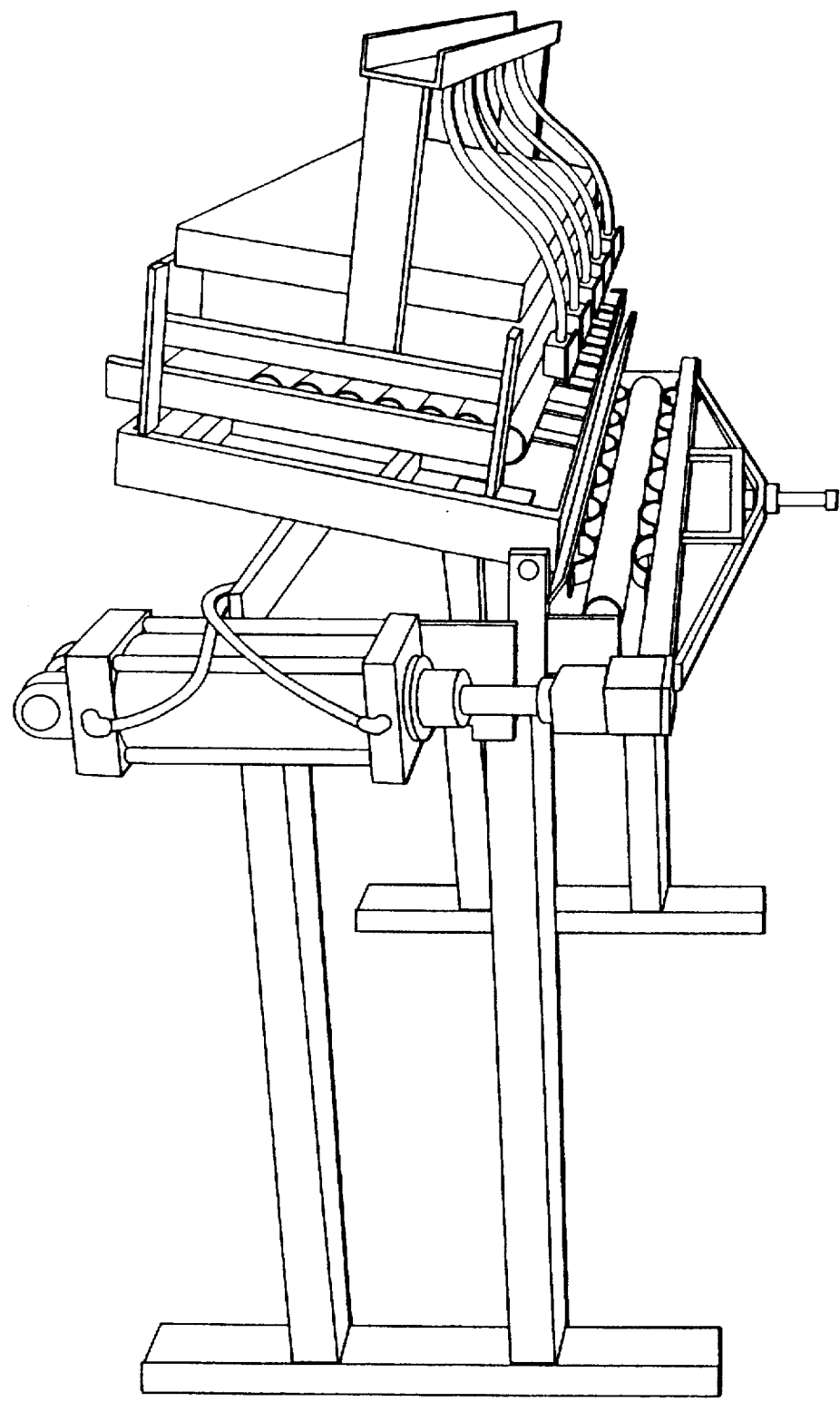
FIG. 6 is a perspective side view of the device of FIG. 5 shown as it would appear at the commencement of the pressing step.
Figure 7:
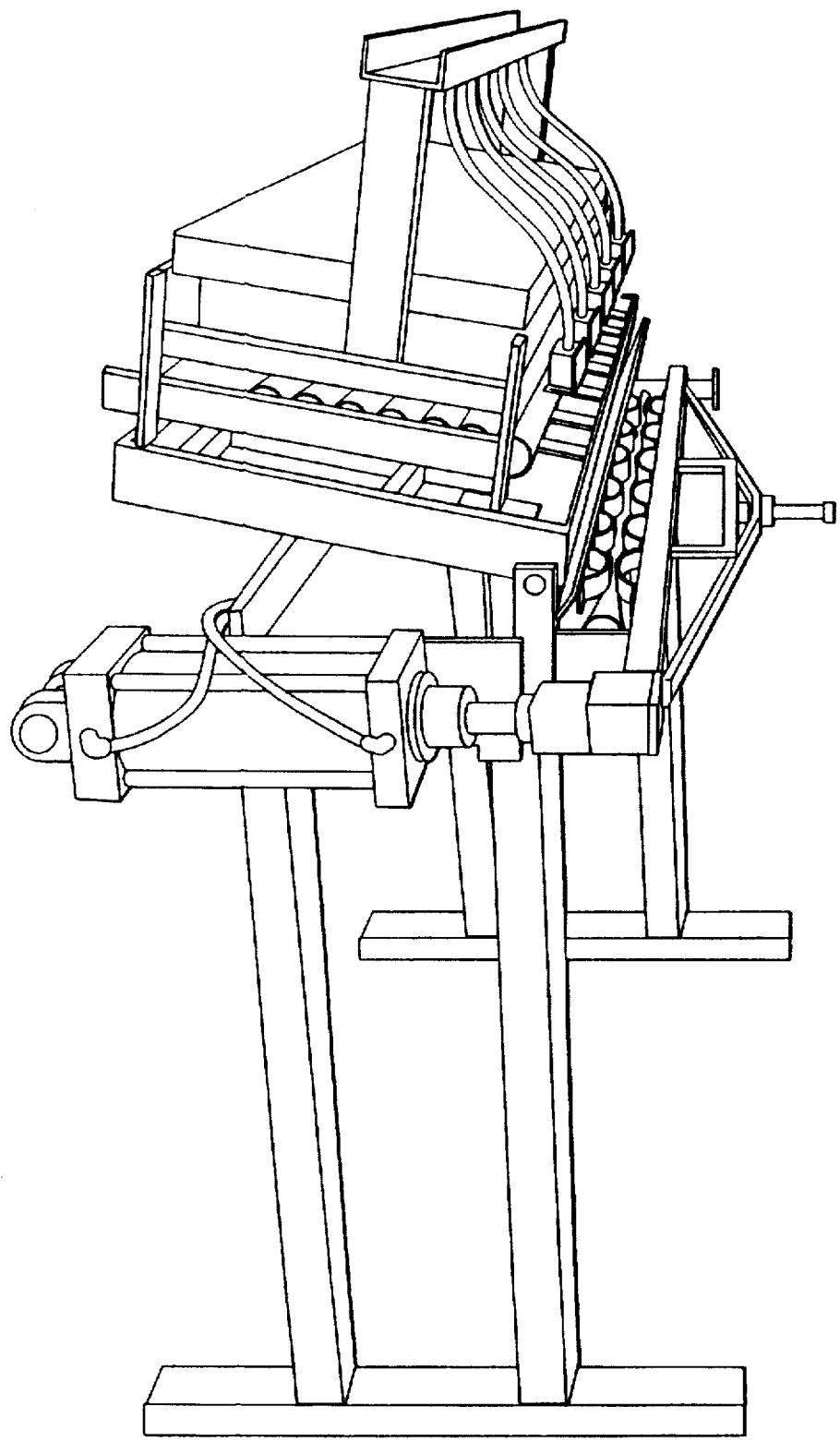
FIG. 7 is a perspective side view of the device of FIG. 5 shown as it would appear at the completion of the pressing step.
Figure 8:
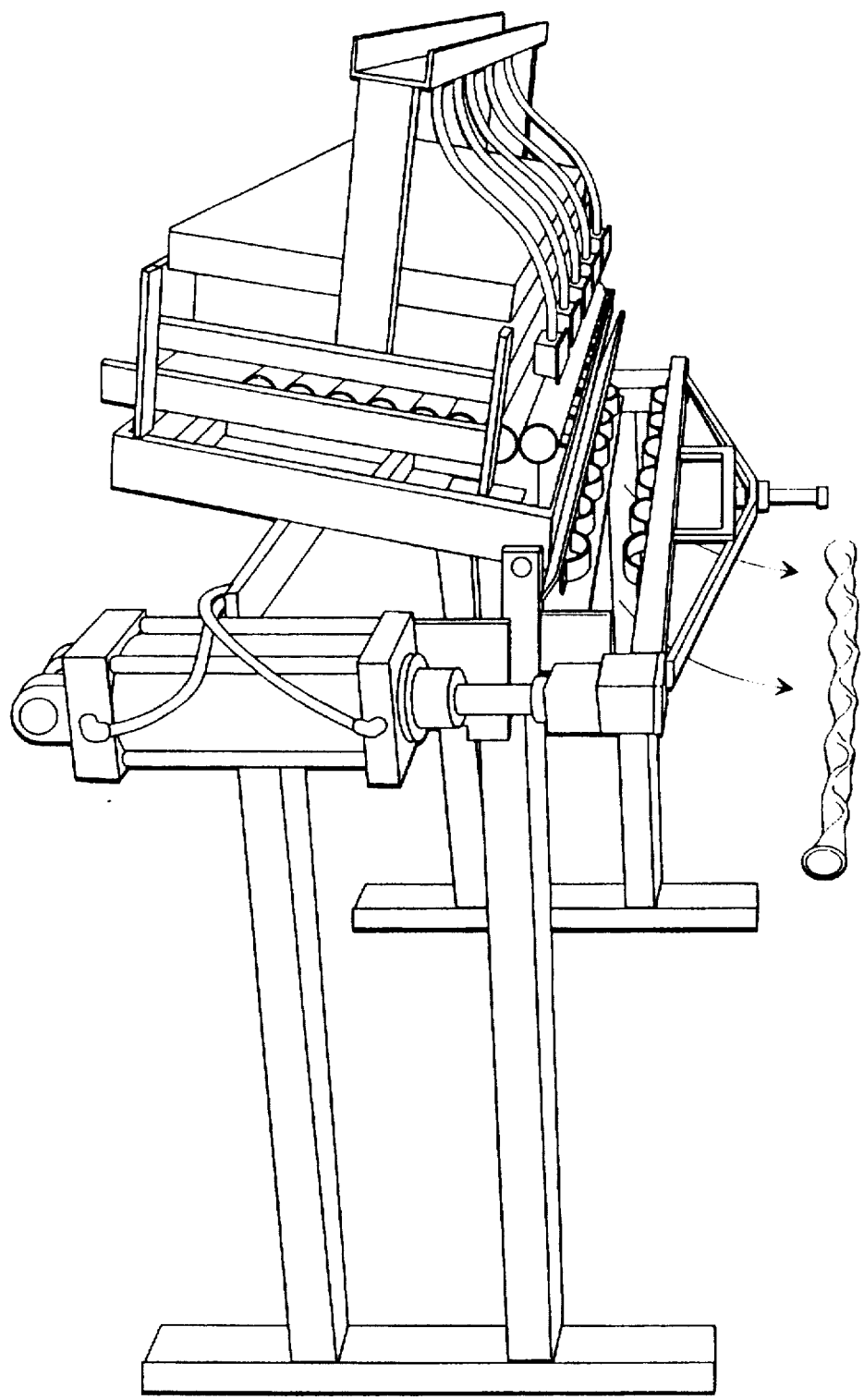
FIG. 8 is a perspective side view of the device of FIG. 5 shown as it would appear after the completion of the discharging step.

The fabrication process is accomplished by loading the hot unshaped tube 110, cut to length, into the fabrication device as shown in FIG. 5 and FIG. 6 and by forming the depressions into opposite sides of the tube 110 using pressure applied from a two (2) piece die as shown FIG. 6 and FIG. 7 and by unloading the shaped tube 100 as shown FIG. 8.

Unlike prior art devices there is no need for specially formed complicated fins or other shape or shapes to add strength or for indentations to reduce cost by reducing the amount of material required to form the device or for holes or other modifications to the surface to provide for implementation or for a mold since heat forming with any pipe is sufficient. This greatly simplifies and thus economizes the manufacturing process.

Figure 9:
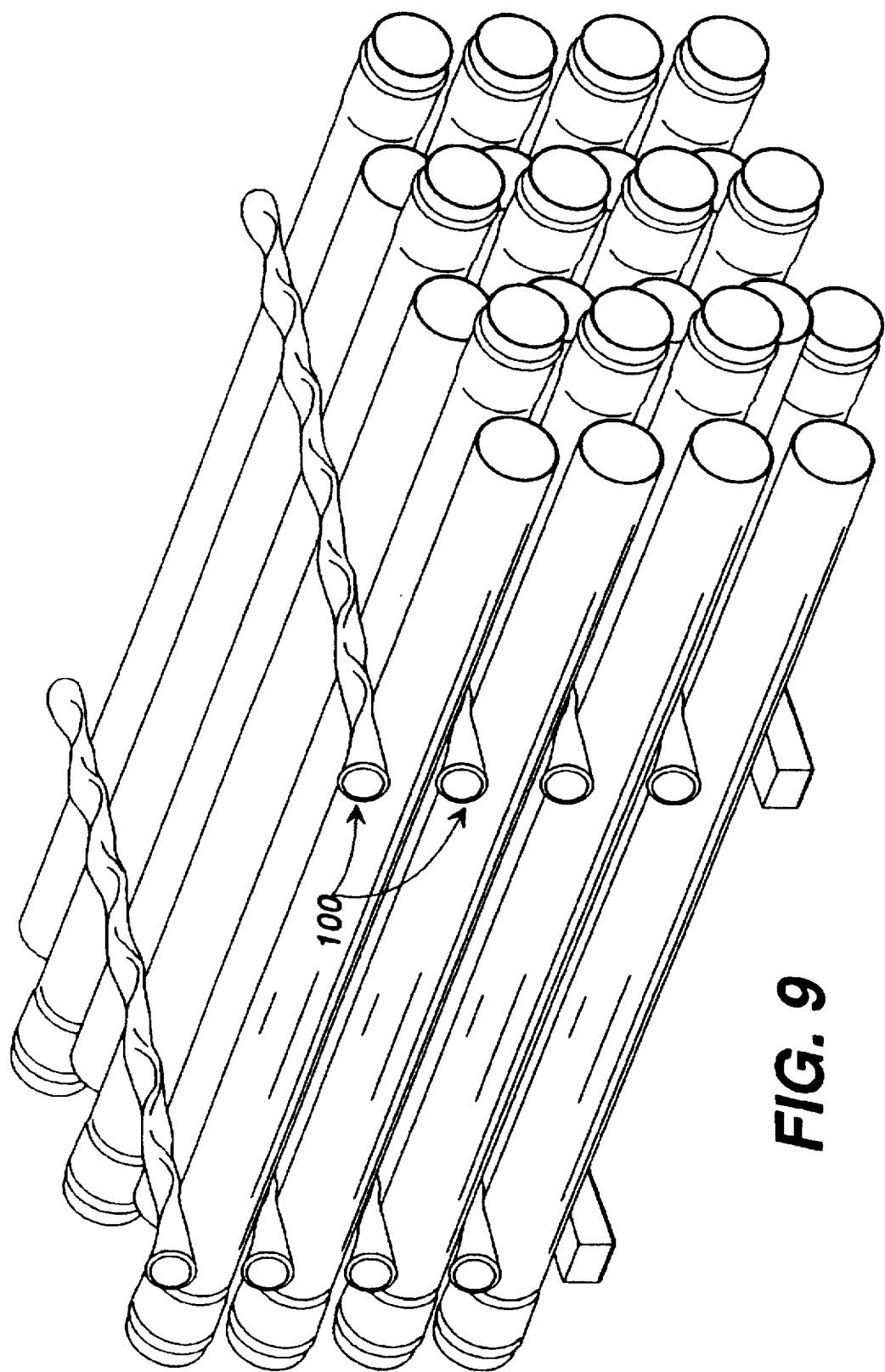
FIG. 9 is a perspective end view of several of the malleable ragglesticks of FIG. 1 installed for intended use.
Figure 10:
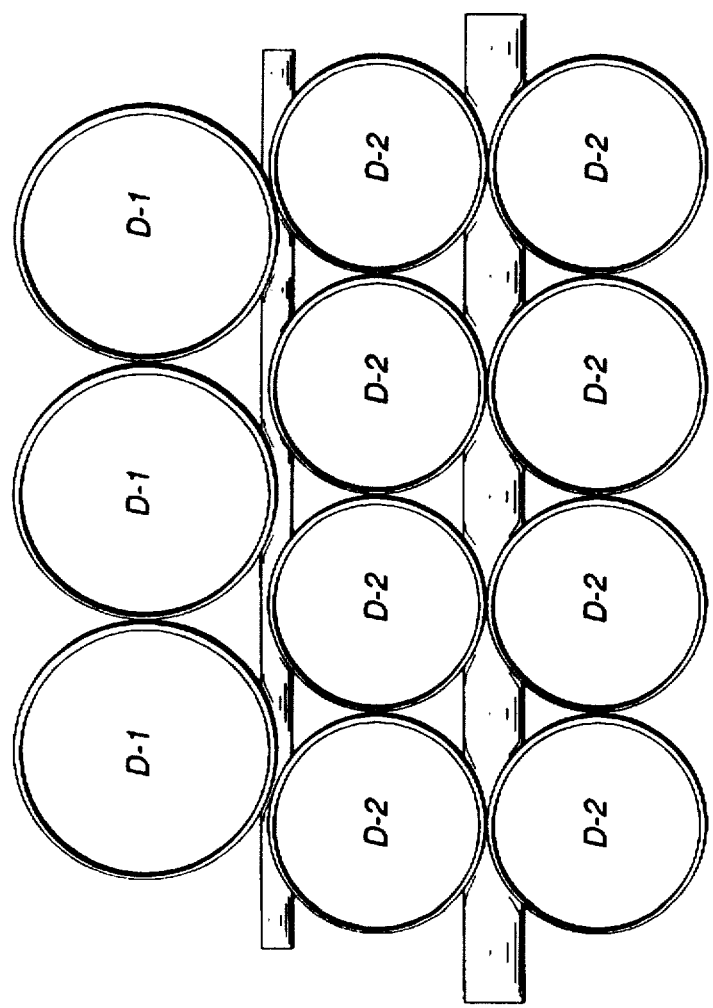
FIG. 10 is a side view of two (2) of the malleable ragglesticks of FIG. 1 installed for operation showing the depressions and the relationship of the depressions to each other when pipes of one diameter are packed under pipes of the same diameter as well as the relationship of the depressions to each other when pipes of one diameter are packed under pipes of a larger diameter.

In use the malleable ragglestick 100 is placed above a row of product or in between two (2) rows of product as shown FIG. 9 and FIG. 10.

Figure 14:
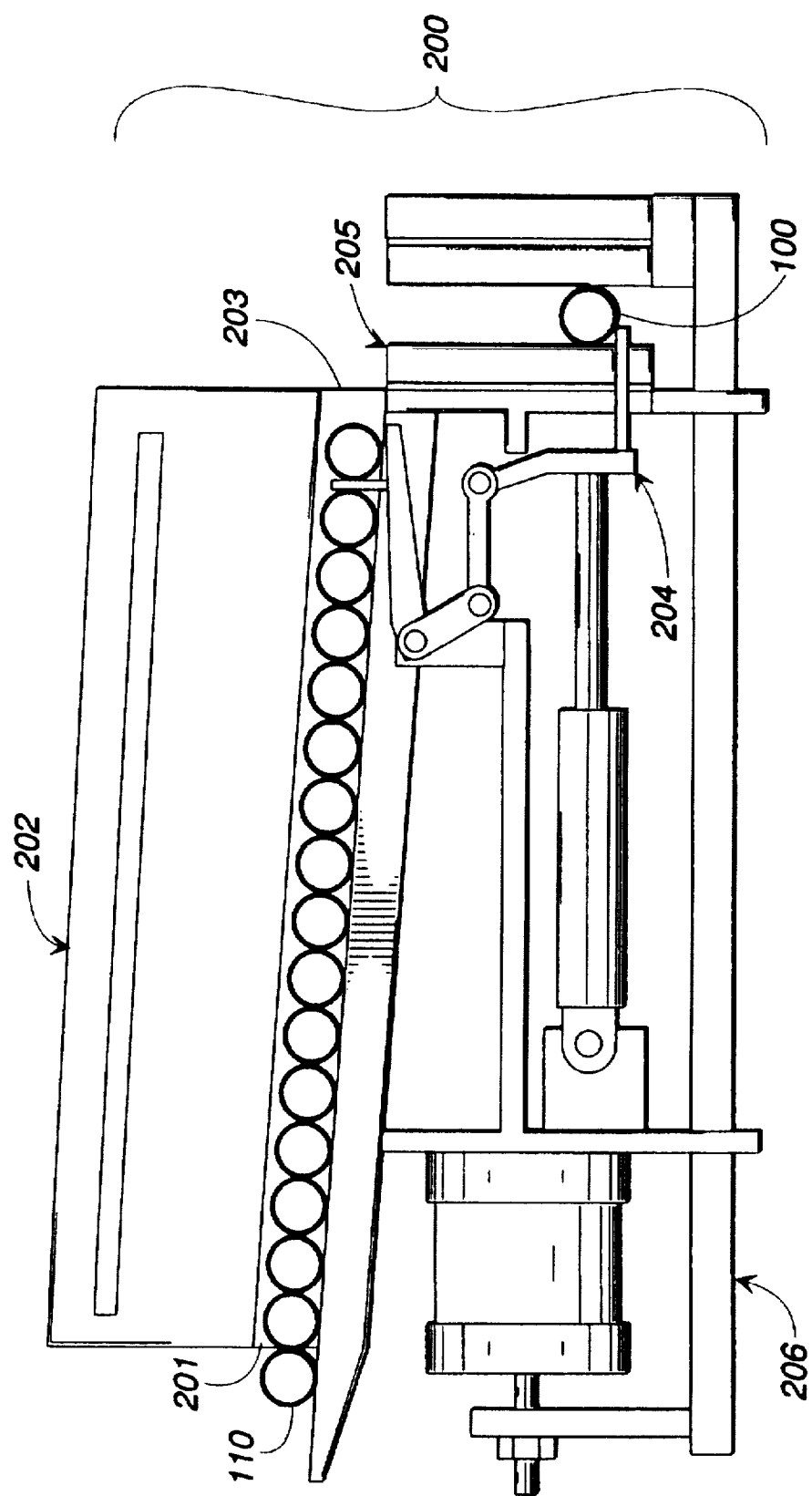
FIG. 14 is an elevation view of the fabrication device apparatus for beat forming the malleable ragglestick.
Figure 15:
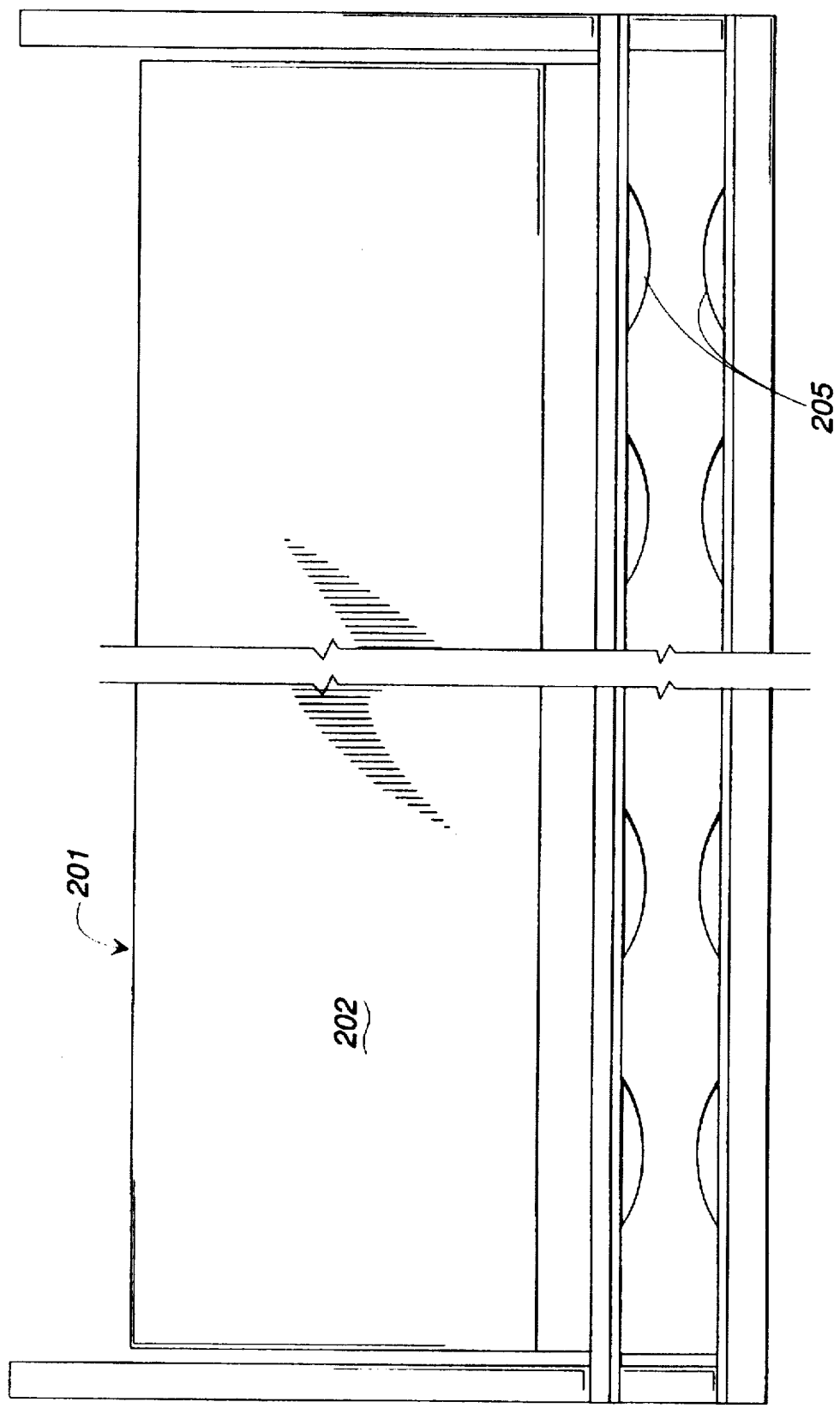
FIG. 15 is a plan view of said apparatus of FIG. 14 indicating the path of unformed ragglestick in the heating means and traversing to the forming molds.
Figure 16:
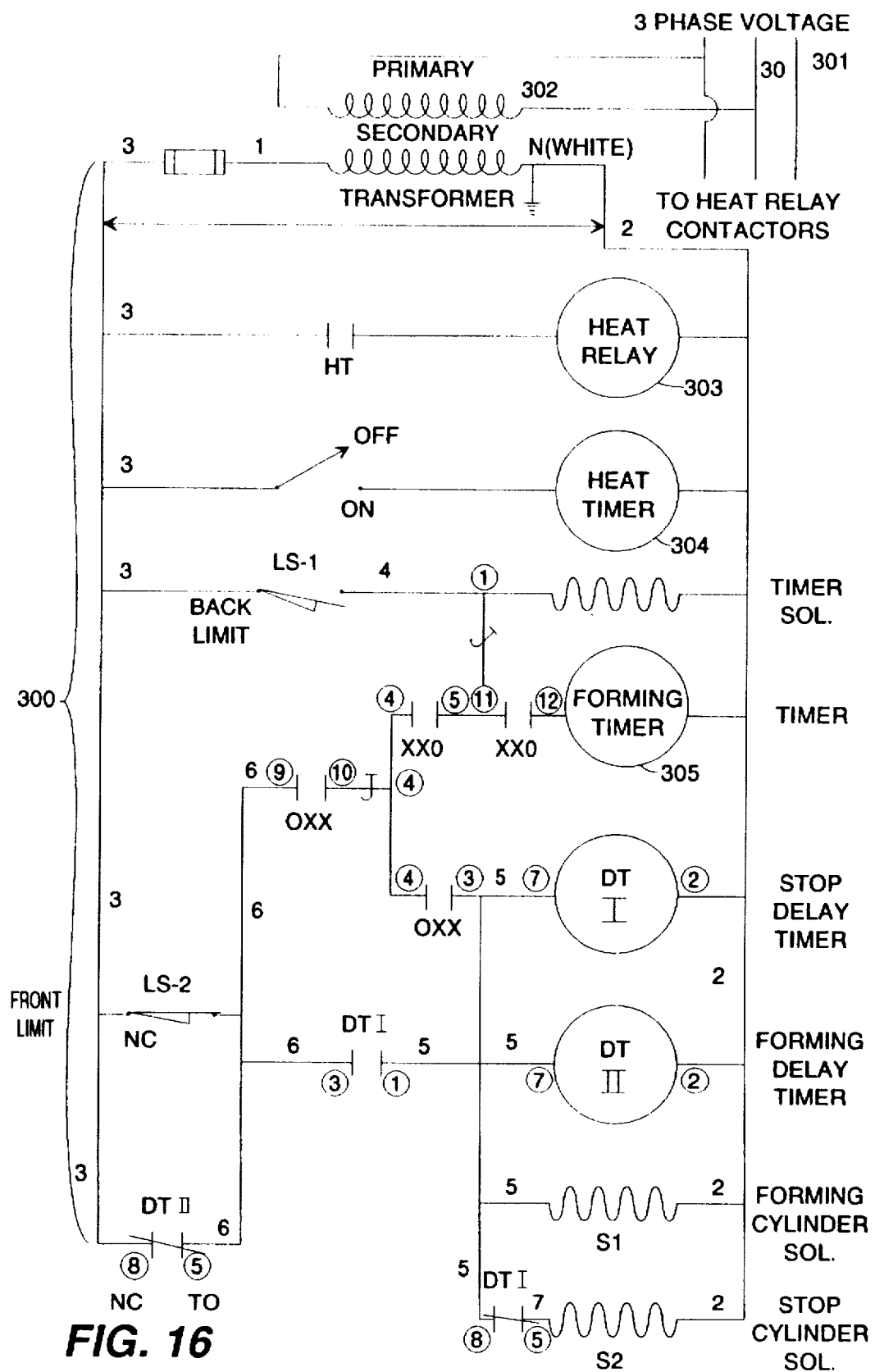
FIG. 16 is an elementary electrical diagram of the control circuit, heat timing circuit, and the forming timing circuit for said apparatus of FIG. 14.

The fabrication process is further shown in FIG. 14 and FIG. 15. The unshaped tube 110 is shown loaded into the fabrication device 200 at the rack entrance 201 and exiting the heating unit 202 at the rack exit 203. The heated unshaped tube 110 is repositioned by the mechanism to control material advance 204 to a position in the forming molds press 205 where the mechanism to operate forming molds 206 causes the pressing together of the forming molds press 205 and the heated generally tubular member 110 to heat form the desired seats, depressions, indentures, saddles or other surface shapes in the generally tubular member 110. FIG. 16 shows the electrical system 300 elementary diagram connecting the power supply 301, the transformer 302, the heat relay 303, the heat timer 304, and the forming timer 305 which controls the length of time the forming mold press 205 is engaged.

In an alternate preferred embodiment, the heating unit 202 is gas fired.

In another alternate preferred embodiment, the generally tubular members are heated, and partially cooled, by pressing contact with heated molds with or without preheating of the generally tubular member in the heating unit 202.

While the Invention has been particularly shown and described with reference to the preferred embodiments thereof, it will be understood by those skilled in the art that various alterations in form and detail may be made therein without departing from the spirit and scope on the Invention.

The embodiments of the invention in which an exclusive property or privilege is claimed are defined as follows:

1. An apparatus for facilitating storage and shipment of units such as pipe, said apparatus comprising:
   a multiplicity of heat formed, generally tubular members to be placed underneath or inbetween the units
   having a length of effectively the width of the area to be used for storage and having an impervious or continuous surface and,
   having means for immobilizing the units with little more than simply the application of the generally tubular members, and
   said means comprising one or more sets of a multiplicity of spaced apart, parallel, generally semi-cylindrical heat formed indentations disposed to receive units.

2. The apparatus of claim 1, wherein the radius of said generally semi-cylindrical indentions being greater than the depth of said indention.

3. The apparatus of claim 2, wherein said generally semi-cylindrical indentions are placed on opposite sides of each generally tubular member at the same spacing and aligned such that each indentation has a corresponding indention on the opposite side of the generally tubular member.

4. The apparatus of claim 2, wherein a first set of said generally semi-cylindrical indentations are placed on a first side of each generally tubular member at a first spacing and with a first radius of said semi-cylindrical indentation and further a second set of additional semi-cylindrical indentations are placed on a second side of each generally tubular member opposite the first side, at a second spacing and with a second radius of said semi-cylindrical indentions.

5. The apparatus of claim 1 wherein said means comprise portions of the generally tubular member which are concavo-concave configuration seats, said seats longitudinally spaced along a first side of the generally tubular member, the axis of said seats being substantially parallel and extending substantially perpendicular to the longitudinal axis of said member, said seats being heat adapted to removably and self-lockingly receive the adjacent units of a first radius.

6. The apparatus of claim 5, wherein said concavo-concave configuration seats are placed on opposite sides of each generally tubular member at the same spacing and aligned such that each seat has a corresponding seat on the opposite side of the generally tubular member.

7. The apparatus of claim 5, wherein a first set of said seats are heat adapted for units of a first radius and are placed on a first side of each generally tubular member at a first spacing and further placing a second set of said seats heat adapted for units of a second radius and placed on a second side of each generally tubular member opposite the first side, at a second spacing.

8. The apparatus in claim 1, wherein the generally tubular members are composed of a malleable material.

9. The apparatus in claim 1, wherein the generally tubular members are composed of a plastic material.

10. The apparatus in claim 1, wherein the means for immobilizing the units are formed integral to the generally tubular members without adding material to the original shape of the generally tubular members and without removing material from the generally tubular members.

* * * * *